Patented June 30, 1953

2,644,014

UNITED STATES PATENT OFFICE 2,644,014

PHENOL PRODUCTION

Robert H. Saunders, Oxford, Pa., assignor to Hercules Powder Company, Wilmington, Del., a corporation of Delaware No Drawing. Application December 30, 1949, Serial No. 136,167

16 Claims. (Cl. 260—621)

This invention relates to α-hydroxy and α,β-unsaturated alkyl-substituted aryl compounds and, more particularly, to a process for the conversion of these compounds to phenols.

There have been numerous processes developed for the purpose of producing phenols synthetically due to the fact that the demand for phenols, such as the cresols and phenol itself, far exceeds the amount which may be recovered in the refining of coal tar but only a limited number of the processes for the preparation of phenol have proved sufficiently satisfactory to be applicable to commercial production. One of these involves the sulfonation of benzene and the formation of sodium benzene sulfonate which is fused with sodium hydroxide to produce sodium phenolate. The phenolate upon acidification yields phenol which may be purified by distillation. However, probably the most widely used commercial process today for the production of phenol is that of hydrolyzing chlorobenzene with aqueous sodium hydroxide under conditions of high temperature and pressure to produce sodium phenolate which then is acidified to give phenol. The chlorobenzene may be prepared either by direct chlorination of benzene or by chlorination with a mixture of hydrogen chloride and oxygen.

Even those processes which have been adapted to commercial production of phenol are not entirely satisfactory. They require large equipment investment and installation to provide facilities for the raw materials used and they must be operated on the basis of large production capacity in order to produce phenol at a reasonable price. In addition, the processes are disadvantageous because of the many steps involved.

Now in accordance with this invention, it has been found that phenols may be prepared simply, efficiently, and economically from α-hydroxy and α,β-unsaturated alkyl-substituted aryl compounds by contacting such compounds in a polar solvent with an acid and a peroxidic material. It is intended that the term "aryl" when used herein includes not only the phenyl radical but the naphthalene, anthracene, phenanthrene radicals, and the like and also the alkyl-substituted derivatives of these groups such as the tolyl, ethyl phenyl, methyl naphthyl, ethyl naphthyl, and the like. The temperature utilized may be between 15° and 100° C., but preferably below 50° C. The present process is straightforward and is free from many of the disadvantages connected with the other processes discussed. In addition to producing phenols, the process at the same time produces aliphatic ketones and aldehydes as valuable products. This also is in contrast to previous processes for preparing phenols. The reaction is carried out for a sufficient length of time to obtain the maximum conversion of the alcohol or the vinyl dehydration product thereof to the phenol and the products can usually be separated from the reaction mixture by distillation. When α,α-dimethylbenzyl alcohol or α-methylstyrene is used as a starting material, the products of the decomposition reaction are phenol and acetone.

The following examples constitute illustrations of specific embodiments of the invention generally outlined above. All amounts are based on parts by weight unless otherwise specified.

Example 1

Twenty parts of glacial acetic acid was added to a reaction vessel fitted with a reflux condenser and a thermometer followed by 4.1 parts of α,α-dimethylbenzyl alcohol, 3.6 parts of a 29% aqueous solution of hydrogen peroxide and 0.2 part of concentrated sulfuric acid. After maintaining the temperature at 35° for 17 hours, analysis of the reaction mixture showed the presence of 9% phenol which represented 89% of the theoretical yield of phenol based upon the weight of α,α-dimethylbenzyl alcohol originally present. The phenol and acetone produced by the reaction were recovered from the reaction mixture and separated by distillation. The yield of acetone was 85% of the theoretical yield based upon the weight of alcohol originally present.

Example 2

The procedure of Example 1 was followed using 20 parts of glacial acetic acid, 3.6 parts of 81% tert-butyl hydroperoxide, 4.1 parts of 93% α-methylstyrene and 0.2 part of concentrated sulfuric acid and allowing the reaction to proceed at 35° C. for 22 hours. By this means 80% of the α-methylstyrene originally present was converted to phenol and acetone.

Example 3

The process of Example 1 was followed using 20 parts of glacial acetic acid, 2 parts of α,α-dimethylbenzyl alcohol, 2 parts of 98.3% α,α-dimethylbenzyl hydroperoxide, 1.8 parts of a 29% aqueous solution of hydrogen peroxide and 0.2 part of concentrated sulfuric acid. The temperature of the reaction mixture was maintained at 35° for 18.5 hours. The α,α-dimethylbenzyl hydroperoxide was prepared by oxidizing cumene in the liquid phase with molecular oxygen in the presence of aqueous alkali at 90° C.

By this means phenol was produced to the extent of 86% and acetone to the extent of 83% of the theoretical yields based on the combined quantities of α,α-dimethylbenzyl hydroperoxide and α,α-dimethylbenzyl alcohol originally present.

Example 4

One hundred ninety parts of water were added to a reaction vessel fitted with a reflux condenser, a thermometer, and a stirrer followed by 4 parts of α,α-dimethylbenzyl alcohol, 7 parts of a 29% aqueous solution of hydrogen peroxide, and 1 part of 85% phosphoric acid. The mixture was stirred vigorously at 35° for 17 hours. By this means 78% of the α,α-dimethylbenzyl alcohol originally present was converted to phenol and acetone.

*Example 5*

The procedure of Example 4 was followed using 30 parts of 90% formic acid, 3.6 parts of 81% tert-butyl hydroperoxide, 4.1 parts of α,α-dimethylbenzyl alcohol, and 0.3 part of p-toluenesulfonic acid (monohydrate). The mixture was stirred vigorously at 30° for 24 hours. By this means 70% of the α,α-dimethylbenzyl alcohol originally present was converted to phenol and acetone.

The process of this invention has been set forth in the examples as applied to α,α-dimethylbenzyl alcohol, α-methylstyrene, and a mixture of α,α-dimethylbenzyl alcohol and α,α-dimethylbenzyl hydroperoxide but other alcohols, styrenes and mixtures of alcohols and hydroperoxides are also operable. The process of this invention may be carried out using α-hydroxy alkyl-substituted aryl and alkaryl compounds and α,β-unsaturated alkyl-substituted aryl and alkaryl compounds, or, in other words, benzyl alcohols and the dehydration products of α-alkylbenzyl alcohols.

Representative of the α-hydroxy alkyl-substituted aryl compounds mentioned are benzyl alcohol and benzyl alcohol derivatives such as the α-alkylbenzyl alcohols, for example, α-methylbenzyl, α-ethylbenzyl, α-propylbenzyl, α-isopropylbenzyl alcohol and the like and the α,α-dialkylbenzyl alcohols such as α,α-dimethylbenzyl, α,α-methylethylbenzyl, α,α-diethylbenzyl alcohol, and the like. Derivatives of the benzyl alcohols, α-alkylbenzyl alcohols and α,α-dialkylbenzyl alcohols in which there are substituents attached to the carbon ring such as, for example, p-methylbenzyl alcohol, α-methyl-p-methylbenzyl alcohol, α,α-dimethyl-p-methylbenzyl alcohol, and the like are also operable. The substituent groups attached to the carbon ring of the molecule may be in the ortho, meta, or para positions and as in the case of the alkyl groups attached to the α-carbon atom of the molecule, may be any of a wide number of alkyl groups and are not restricted to lower members of the homologous series. In addition, it is noted that the compounds operable in this invention need not be derived from benzene, for derivatives of naphthalene, anthracene, phenanthrene and the like which are capable of producing a carbonium ion may also be utilized. Thus, for example, dimethyl-7-methylphenanthryl-1 carbinol and 1-methyl-7-isopropenyl phenanthrene by the process of this invention may both be converted to 1-methyl-7-hydroxyphenanthrene.

The α,β-unsaturated alkyl-substituted aryl compounds which may be utilized in this invention may be considered as dehydration derivatives of the above-mentioned α-hydroxy alkylsubstituted aryl compounds. Illustrative of these unsaturates are styrene, the α-alkylstyrenes such as α-methyl, α-ethyl, α-propyl, α-isopropylstyrene and the like and β-alkylstyrenes such as β-methyl, β-ethyl, β-propyl, β-isopropylstyrene and the like as well as α,β-dialkyl-substituted styrenes such as α,β-dimethyl, α-methyl, β-ethylstyrene, and the like. The compounds may also have alkyl groups attached to the carbon ring as in the case of the α-hydroxy alkyl-substituted aryl compounds above.

All of the above compounds when employed in the process of this invention yield a phenol or substituted phenol and an aldehyde or ketone depending upon the structure of the particular groups attached to the α-carbon atom and the carbon ring. Thus, in the case of benzyl alcohol, there is produced phenol and formaldehyde and in the case of α-methylbenzyl alcohol and also in the case of styrene, there is produced phenol and acetaldehyde. α,α-Dimethylbenzyl alcohol and α-methylstyrene, besides yielding phenol, also produce acetone. α,α-Dimethyl-p-methylbenzyl alcohol and α-methyl-p-methylstyrene yield p-cresol. One skilled in the art can easily determine from the structural formula of the starting materials the phenolic compound and ketone or aldehyde which will be produced in any given instance.

As shown by Example 3, a mixture of α,α-dimethylbenzyl hydroperoxide and α,α-dimethylbenzyl alcohol is reduced to phenol and acetone under the conditions of the reaction and it is evident that other benzyl alcohols containing similar hydroperoxides will behave in a like manner. Styrene compounds containing these hydroperoxides are also operable in this invention with both the styrene compound and hydroperoxide being reduced to the corresponding phenolic compounds.

The process of this invention may be carried out at temperatures up to about 100° but lower temperatures are preferred as producing larger yields of the desired reaction products. In general, temperatures below 50° C. are preferred and a range of about 25°–35° is particularly preferred. Although the reaction will proceed at temperatures lower than 15° C., very low temperatures should be avoided due to the extended reaction times which result. The optimum temperature in any given case will depend upon the sensitivity of the peroxidic agent to acid, some peroxides or hydroperoxides being more easily decomposed than others by small amounts of acid.

Any polar liquid inert to the reactants may be used as a solvent for the reaction. Acetic acid has been found to fulfill these requirements nicely but other solvents are equally valuable such as, for example, other low molecular weight carboxylic acids of which formic acid, propionic acid, and n-butyric acid are representative. Other polar solvents which do not react with the reactants are also operable. Thus, water may be used in some instances.

The catalysts which are useful in carrying out this invention are strongly acidic and are generally illustrated by those materials known as condensation catalysts. These catalysts include most of the mineral acids and strong organic acids. Exemplary of the inorganic acids are sulfuric, hydrochloric and phosphoric. The organic acids include the organic sulfonic acids, for example, benzenesulfonic acid and p-toluenesulfonic acid as well as organic acids such as monochloroacetic acid, dichloroacetic acid, and trichloroacetic acid. Friedel-Crafts catalysts such as aluminum chloride, ferric chloride, boron trifluoride and zinc chloride may also be employed. The concentration of the catalyst based on the diluent will depend to some extent on the reactivity of the catalyst, the temperature of the reaction, and the desired reaction time and may vary from about 0.01% to about 50% of the weight of the diluent. Although the process is operable beyond these limits, it is impractical for the most part due to extended reaction times at the lower limit and the danger of condensation reactions at the upper limit. The diluent should be present in an amount sufficient at least to dissolve the reactants and preferably equal to five or ten times the weight of the alcohol or styrene compound being converted. The maximum amount of diluent is not limited by the operability of the process but by the difficulty in recovering the product when large volumes of diluent are used.

A variety of oxidizing materials may be utilized in carrying out the process of this invention. Hydrogen peroxide is preferred in this regard due to its low cost, but other peroxidic materials are equally operable. As shown by Example 2, tert-butyl hydroperoxide is useful and other alkyl hydroperoxides and alkyl peroxides may be utilized. Thus, the hydroperoxides and also the peroxides of isobutane, 2-methylbutane, 2-ethylbutane, 2-methylpentane, 3-methylpentane, 2,3-dimethylbutane, 2,4-dimethylbutane and their homologs are operable in this invention. Likewise, inorganic oxidizing agent such as, for example, potassium persulfate may also be employed. In general, any peroxidic material which is relatively stable toward acids is operable in this invention. The oxidizing material is preferably employed in an amount at least as large as the molecular equivalent of the quantity of alcohol or vinyl compound to be converted.

The process in accordance with this invention represents a more economical and efficient means for obtaining not only phenol itself but also other phenolic compounds such as p-cresol and hydroquinone. The latter two compounds are, of course, obtained by the decomposition of $\alpha,\alpha$-dimethyl-p-methylbenzyl alcohol and $\alpha,\alpha,\alpha',\alpha'$-tetramethyl-p-xylylene dialcohol, respectively. Due to the simple nature of the process, the latter will be found particularly applicable to small-scale installations and will not require the vast outlay of capital and equipment required by previous processes.

What I claim and desire to protect by Letters Patent is:

1. The process of producing a phenol which comprises contacting a compound selected from the group consisting of $\alpha$-hydroxy alkyl-substituted and $\alpha,\beta$-unsaturated alkyl-substituted aryl compounds at a temperature between about 15° C. and about 100° C. with an oxidizing material selected from the group consisting of persulfates, hydrogen peroxide, alkyl peroxides, and alkyl hydroperoxides in a polar solvent inert to the reactants in the presence of a condensation catalyst.

2. The process of claim 1 wherein the oxidizing material is hydrogen peroxide.

3. The process of claim 1 wherein the oxidizing material is an alkyl peroxide.

4. The process of claim 1 wherein the oxidizing material is an alkyl hydroperoxide.

5. The process of producing a phenol which comprises contacting a compound selected from the group consisting of $\alpha$-hydroxy alkyl-substituted and $\alpha,\beta$-unsaturated alkyl-substituted aryl compounds at a temperature between about 15° C. and about 100° C. with an oxidizing material selected from the group consisting of persulfates, hydrogen peroxide, alkyl peroxides, and alkyl hydroperoxides in a polar solvent inert to the reactants in the presence of a condensation catalyst and separating a phenol from the reaction mixture.

6. The process of producing a phenol which comprises contacting an $\alpha$-hydroxy alkyl-substituted aryl compound at a temperature between about 15° C. and about 100° C. with an oxidizing material selected from the group consisting of persulfates, hydrogen peroxide, alkyl peroxides, and alkyl hydroperoxides in a polar solvent inert to the reactants in the presence of a condensation catalyst.

7. The process of claim 6 wherein the oxidizing material is hydrogen peroxide and the condensation catalyst is sulfuric acid.

8. The process of claim 6 wherein the oxidizing material is an alkyl peroxide and the condensation catalyst is sulfuric acid.

9. The process of claim 6 wherein the oxidizing material is an alkyl hydroperoxide and the condensation catalyst is sulfuric acid.

10. The process of producing a phenol which comprises contacting an $\alpha,\beta$-unsaturated alkyl-substituted aryl compound at a temperature between about 15° C. and about 100° C. with an oxidizing material selected from the group consisting of persulfates, hydrogen peroxide, alkyl peroxides, and alkyl hydroperoxides in a polar solvent inert to the reactants in the presence of a condensation catalyst.

11. The process of claim 10 wherein the oxidizing material is hydrogen peroxide and the condensation catalyst is sulfuric acid.

12. The process of claim 10 wherein the oxidizing material is an alkyl peroxide and the condensation catalyst is sulfuric acid.

13. The process of claim 10 wherein the oxidizing material is an alkyl hydroperoxide and the condensation catalyst is sulphuric acid.

14. The process of producing phenol which comprises contacting $\alpha$-methylstyrene at a temperature between about 15° C. and about 100° C. with hydrogen peroxide in a polar solvent inert to the reactants in the presence of sulfuric acid.

15. The process of producing phenol which comprises contacting $\alpha,\alpha$-dimethylbenzyl alcohol at a temperature between about 15° C. and about 100° C. with hydrogen peroxide in a polar solvent inert to the reactants in the presence of sulfuric acid.

16. The process of producing phenol which comprises contacting $\alpha,\alpha$-dimethylbenzyl alcohol in admixture with $\alpha,\alpha$-dimethylbenzyl hydroperoxide at a temperature between about 15° C. and about 100° C. with hydrogen peroxide in a polar solvent inert to the reactants in the presence of sulfuric acid.

ROBERT H. SAUNDERS.

References Cited in the file of this patent

UNITED STATES PATENTS

| Number | Name | Date |
|---|---|---|
| 2,176,407 | Milas | Oct. 17, 1939 |
| 2,223,807 | Milas | Dec. 3, 1940 |
| 2,484,841 | Lorand | Oct. 18, 1949 |

OTHER REFERENCES

Berichte (I), vol. 77B, pp. 257–64 (1944), Hock et al., (abstracted in Chemical Abstracts, vol. 39, p. 3526).

Berichte (II), vol. 14, p. 1144 (Nencki).

Kharasch et al., Jour. Organic Chemistry, vol. 15, No. 4 (July 1950), pp. 748–52 (5 pages). Article received December 7, 1949, for publication.